Patented Aug. 21, 1934

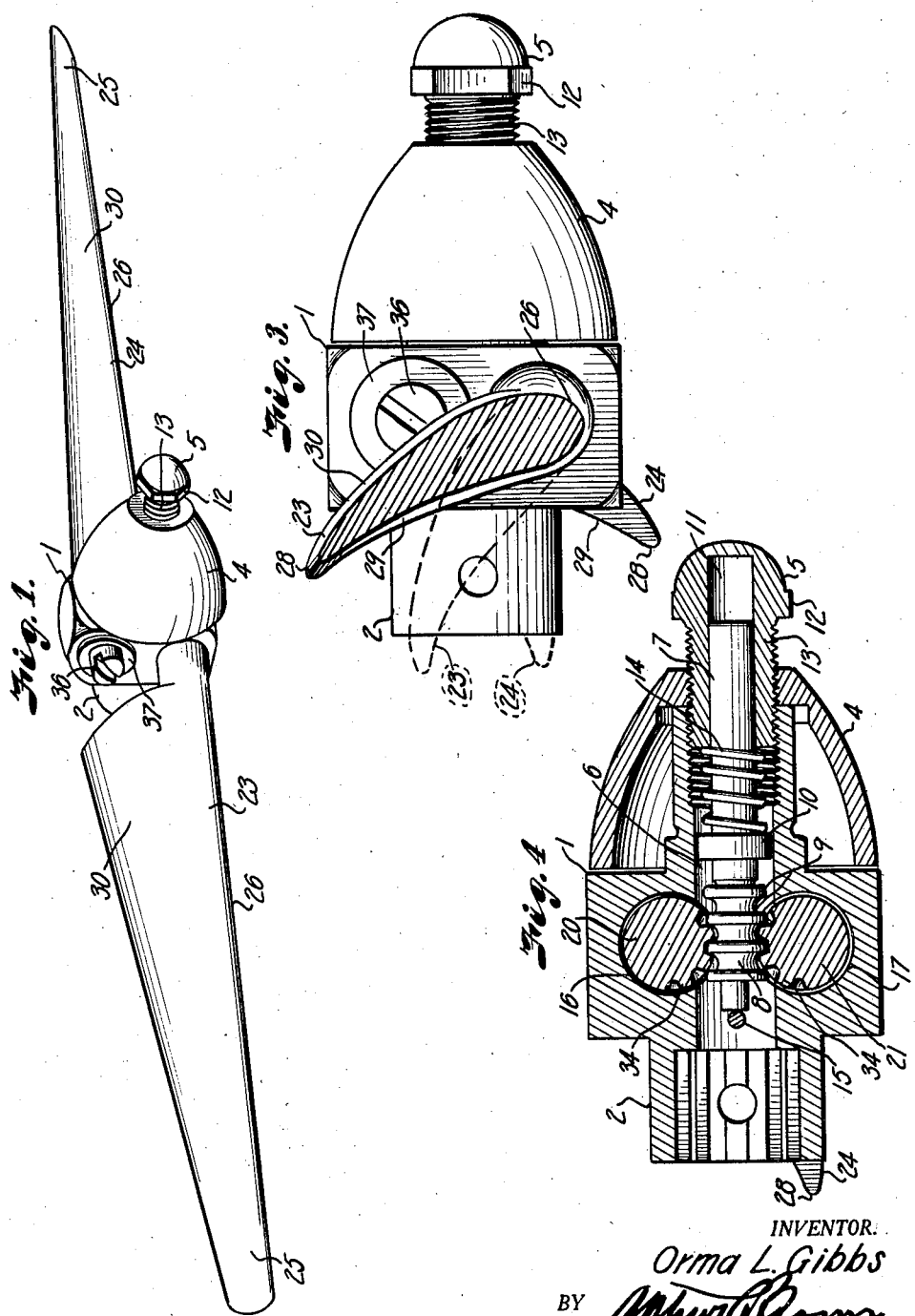

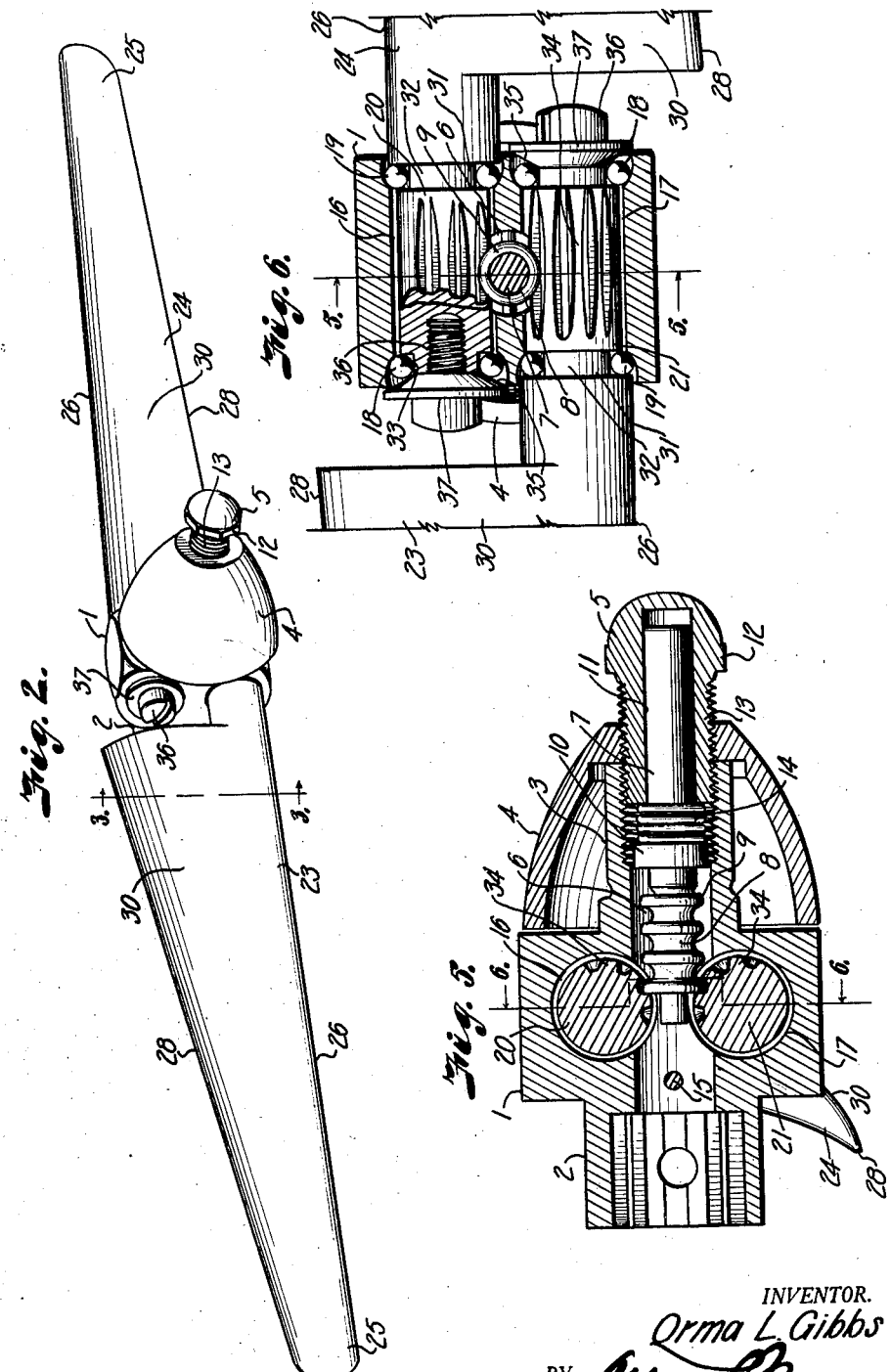

1,970,847

UNITED STATES PATENT OFFICE 1,970,847

AIRPLANE PROPELLER

Orma L. Gibbs, Kansas City, Mo., assignor of one-half to Eugene B. Berkowitz, Kansas City, Mo.

Application February 11, 1932, Serial No. 592,276

2 Claims. (Cl. 170—162)

My invention relates to propellers and particularly to those of that character adapted for airplane use, and has for its principal object to provide for automatically changing the effective pitch of the propeller blades proportional to the varying load conditions acting thereon.

In accomplishing this and other objects of the invention, I have provided improved details of structure, the preferred form of which is illustrated in the accompanying drawings, wherein:

Fig. 1 is a perspective view of a propeller embodying my invention and illustrating the position of the blades when the propeller is at rest or operating under minimum load conditions.

Fig. 2 is a similar view of the propeller illustrating position of the blades when the propeller is operating under its maximum load conditions.

Fig. 3 is a sectional view through one of the blades on the line 3—3, of Fig. 2, illustrating minimum pitch of the blades in full lines and maximum pitch in dotted lines.

Fig. 4 is a longitudinal sectional view through the propeller hub illustrating position of the control parts when the blades are operating under minimum load conditions.

Fig. 5 is a similar view illustrating the control parts when the blades are operating under maximum load conditions.

Fig. 6 is a cross sectional view through the hub illustrating mounting of the blades in the hub.

Referring more in detail to the drawings:

1 designates the propeller hub which, in the form illustrated, includes a substantially rectangular body having an integral socket portion 2 on its rear face whereby the propeller may be mounted on its operating shaft (not shown) in any suitable manner, and having a boss 3 on its front face for mounting the usual spinner 4 and adjusting nut 5 later described. Extending axially through the hub and through the boss 3 is a cylindrical bore 6 for housing a reciprocable blade control shaft 7.

The shaft 7 has a head portion 8 provided with a series of spaced circumferential ribs 9 forming rack teeth for a purpose later described. Formed on the shaft adjacent the foremost rib is a collar 10 for guiding and retaining the shaft concentrically of the bore. The forward end of the shaft is slidably supported in a bore 11 of the adjusting nut 5 previously mentioned.

The nut 5 includes a polygonal-shaped head 12 and a threaded shank 13 that is threaded into the forward end of the bore 6 to close the open end thereof and load an expansion spring 14. The spring 14 is coiled about the shaft and has one end engaging against the collar and its other end against the end of the shank whereby the shaft is normally retained in retracted position with the rear end thereof in engagement with a stop member 15 located in the rear end of the bore. The stop member may be a pin, such as shown, having its ends anchored in the body portion of the hub, or the end of the bore may be closed as desired.

Formed in the hub and extending at right angles to the bore are spaced, parallel bores 16 and 17 having their peripheries intersecting the bore 6 on opposite diametrical sides thereof. The ends of the bores 16 and 17 are preferably counterbored to provide races for anti-friction bearings 18 and 19 which mount the spindles 20 and 21 of propeller blades 23 and 24 now described.

The propeller blades are of novel shape, having relatively narrow tips 25 gradually widening toward the hub. The forward edges of the blades 26 are stream lined and extend parallel with each other and tangentially to a circle having its center concentric with the axis of the bore 6, whereby the blades are positioned to counter-balance each other at the opposite sides of the hub. The trailing edges 28 of the blades are curved rearwardly and laterally of their forward edges to provide the desired shape, and form concaves 29 extending longitudinally of their rear faces and corresponding convex surfaces 30 on their outer faces.

Extending from the inner ends of the blades are the spindles 20 and 21 having reduced ends 31 to accommodate the diameter of the bores and to form bearing races 32 adjacent the base of the blades for the bearing sets 19. The extreme outer ends of the spindles are further reduced adjacent the other set of bearing races 18 to form races 33. The intermediate portion of the spindles are provided with longitudinal grooves at equally spaced intervals about their periphery to provide teeth 34 for engaging the teeth on the control shaft previously described. In order to retain the spindles against longitudinal movement in the hub, the ends thereof are drilled and tapped as at 35 to accommodate screws 36 for securing cone-shaped disks 37 engaging against the bearing sets 18. The spindles are thus rotatably retained between the bearings but their degree of rotation is under control of the spring 14 as hereinafter described in the operation of the propeller.

In assembling the propeller constructed as described, the spindles are mounted in opposite sides of the hub and are secured by the cone disks 37 and screws 36 which may be locked by suitable lock pins or the like to prevent their retractive rotation during movement of the blades.

The shaft 7 is then inserted in the bore so that the ribs 9 engage between the teeth on the spindles and the end thereof engages the stop pin. The spring 14 is then sleeved over the protruding end of the shaft. The spinner 4 is applied to the threaded shank 13 of the adjusting nut and the shank is threaded into the bore to load the spring, after which the spinner may be rotated on the threads to engage the end of the boss 3 to form a lock for the adjusting nut.

It is thus apparent that the spring resists rotary movement of the blades so that the blades are normally retained in the position as shown in Fig. 1 when the propeller is operating under minimum load conditions, which is the maximum pitch of the propeller.

When the load conditions increase, resistance on the blades causes them to rotate in the hub to automatically reduce their pitch. For example, assuming that the propeller is applied to an airplane and the propeller is idling preparatory to the start of a flight, the spring 14 retains the blades at their maximum pitch. But as soon as the speed of the propeller is increased the air load on the blades correspondingly increases until the load begins to exceed the load of the spring, tending to keep the blades in retracted position. The spring therefore yields to the load and permits automatic reduction in the effective pitch of the propeller proportionate to the increase of the load. As soon as the plane attains its normal speed and elevation, the load resistance on the propeller becomes less so that the spring again preponderates to automatically shift the control shaft rearwardly to cause the teeth thereon to rotate the blade spindles in the opposite direction, thereby increasing the effective pitch of the propeller.

It is, therefore, apparent that the load on the motor of the airplane may be retained within its rated power by adjusting tension of the spring 14, by means of the adjusting nut. By thus automatically controlling the pitch of the propeller while in flight it is substantially impossible to stall the motor, due to the aviator placing his controls in such a position that the power required to effect elevation exceeds the power of the motor because the pitch of the blades is automatically reduced to compensate for the sudden additional load on the motor by decreasing the rate of climb.

The propeller thus provides a safety factor because its automatic control assures sufficient motor power to raise the plane from the ground and also enables a high speed of the plane as soon as the abnormal loads are reduced when the plane has attained its elevation.

While I have illustrated my invention as applied to airplane propellers, it is obvious that all types of propellers and fans may be similarly constructed to automatically vary their pitch proportionate to the load being moved thereby.

What I claim and desire to secure by Letters Patent is:

1. In a propeller of the character described, a hub having an axial bore and parallel lateral bores extending through the hub substantially tangentially with opposite diametrical sides of the axial bore and intersecting therewith, spindles rotatably supported in the lateral bores, propeller blades carried by the spindles and having greater areas lying to the rear of the axes of the spindles and adapted to move upon rotation of the spindles toward and from a common transverse plane extending through the axes of the spindles, stop means in one end of the axial bore, an adjusting member in the opposite end of the bore, a control shaft provided with a spring seat portion and slidable in the bore and having teeth engaging with the teeth on the spindles, and a spring coiled about the control shaft and having one end engaging said spring seat portion and its opposite end engaging said adjusting member to normally retain the control shaft in engagement with said stop means when the greater areas of said blades approach said plane and to resist longitudinal movement of the control shaft away from said stop means proportional to the load acting on said areas of the blades tending to rotate said spindles whereby the effective pitch of the propeller blades is controlled by the load acting thereon.

2. In a propeller of the character described, a hub having an axial bore and parallel lateral bores extending through the hub substantially tangentially with opposite diametrical sides of the axial bore and intersecting therewith, two spindles rotatably supported in the lateral bores, propeller blades carried by the spindles and having greater areas lying to the rear of the axes of the spindles and adapted to move upon rotation of the spindles toward and from a common transverse plane extending through the axes of the spindles, stop means in one end of the axial bore, an adjusting member in the opposite end of the bore, a control shaft provided with a spring seat portion and slidable in the bore and having teeth engaging with the teeth on the spindles, a spring coiled about the control shaft and having one end engaging said spring seat portion and its opposite end engaging said adjusting member to normally retain the control shaft in engagement with said stop means when the greater areas of said blades approach said plane and to resist longitudinal movement of the control shaft away from said stop means proportional to the load acting on said areas of the blades tending to rotate said spindles whereby the effective pitch of the propeller blades is controlled by the load acting thereon, and a spinner member threaded on said adjusting member and engaging the hub to lock said adjusting member in adjusted position.

ORMA L. GIBBS.